United States Patent
Shimezawa et al.

(10) Patent No.: US 9,185,743 B2
(45) Date of Patent: Nov. 10, 2015

(54) TERMINAL DEVICE, BASE STATION DEVICE, COMMUNICATION SYSTEM, AND COMMUNICATION METHOD

(75) Inventors: Kazuyuki Shimezawa, Osaka (JP); Toshizo Nogami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/814,608

(22) PCT Filed: Aug. 31, 2011

(86) PCT No.: PCT/JP2011/069759
§ 371 (c)(1),
(2), (4) Date: Feb. 6, 2013

(87) PCT Pub. No.: WO2012/029845
PCT Pub. Date: Mar. 8, 2012

(65) Prior Publication Data
US 2013/0142125 A1 Jun. 6, 2013

(30) Foreign Application Priority Data
Sep. 3, 2010 (JP) .................................. 2010-197884

(51) Int. Cl.
*H04W 4/00* (2009.01)
*H04W 88/02* (2009.01)
*H04B 7/04* (2006.01)
*H04B 7/06* (2006.01)
(Continued)

(52) U.S. Cl.
CPC ............... *H04W 88/02* (2013.01); *H04B 7/046* (2013.01); *H04B 7/063* (2013.01); *H04B 7/0626* (2013.01); *H04B 7/0639* (2013.01); *H04L 5/005* (2013.01); *H04W 8/24* (2013.01)

(58) Field of Classification Search
CPC .................................................... H04W 88/02
See application file for complete search history.

(56) References Cited

U.S. PATENT DOCUMENTS

| 2006/0153098 A1 | 7/2006 | Shimizu et al. |
| 2008/0247488 A1 | 10/2008 | Li et al. |
| 2010/0039970 A1* | 2/2010 | Papasakellariou et al. ... 370/310 |

(Continued)

FOREIGN PATENT DOCUMENTS

| CN | 101764642 A | 6/2010 |
| JP | 2006-197207 A | 7/2006 |

(Continued)

OTHER PUBLICATIONS (WO 2009157169) Power Head Room Reporting Method and Mobile Station Device; Dec. 30, 2009; p. 1-12.*

(Continued)

*Primary Examiner* — Chi H Pham
*Assistant Examiner* — Fahmida Chowdhury
(74) *Attorney, Agent, or Firm* — Birch, Stewart, Kolasch & Birch, LLP (57) ABSTRACT

In a communication system in which a base station performing precoding processing and a mobile terminal communicate with each other, communication is efficiently performed. The terminal device reports to the base station device, information indicating a codebook that the terminal device supports, among a plurality of codebooks. The base station device determines a transmission mode, based on the information indicating the codebook that the terminal device supports.

20 Claims, 8 Drawing Sheets

| MOBILE TERMINAL CAPABILITY INFORMATION | | PARAMETER |
|---|---|---|
| MOBILE TERMINAL CATEGORY | | 1, 2, 3, 4, 5, 6, 7, 8 |
| DL INFORMATION | CARRIER AGGREGATION INFORMATION (NUMBER OF CCs/BANDWIDTH) | 1/20MHz, 2/10+10MHz, 2/20+20MHz, 2/10+20MHz |
| | MAXIMUM NUMBER OF SPATIAL MULTIPLEXING | 1, 2, 4, 8 |
| | STATE OF SUPPORT FOR CHANNEL-STATE-MEASUREMENT REFERENCE SIGNALS FOR 8 ANTENNA PORTS | 0, 1 |
| UL INFORMATION | CARRIER AGGREGATION INFORMATION (NUMBER OF CCs/BANDWIDTH) | 1/20MHz, 2/10+10MHz, 2/20+20MHz, 2/10+20MHz |
| | MAXIMUM NUMBER OF SPATIAL MULTIPLEXING | 1, 2, 4 |

(51) Int. Cl.
 *H04L 5/00* (2006.01)
 *H04W 8/24* (2009.01)

(56) References Cited

U.S. PATENT DOCUMENTS

| | | | |
|---|---|---|---|
| 2010/0046412 A1* | 2/2010 | Varadarajan et al. | 370/312 |
| 2010/0202311 A1* | 8/2010 | Lunttila et al. | 370/252 |
| 2010/0272040 A1* | 10/2010 | Nam et al. | 370/329 |
| 2010/0303011 A1* | 12/2010 | Pan et al. | 370/328 |
| 2011/0149765 A1* | 6/2011 | Gorokhov et al. | 370/252 |
| 2011/0149886 A1* | 6/2011 | Xu et al. | 370/329 |
| 2011/0164519 A1* | 7/2011 | Nishio et al. | 370/252 |
| 2011/0199986 A1* | 8/2011 | Fong et al. | 370/329 |
| 2011/0317657 A1* | 12/2011 | Chmiel et al. | 370/331 |

FOREIGN PATENT DOCUMENTS

| | | | |
|---|---|---|---|
| JP | PCT/JP2009/002825 | * | 6/2009 |
| JP | 2010-524350 A | | 7/2010 |
| WO | 2008/100214 A1 | | 8/2008 |

OTHER PUBLICATIONS

NTT DOCOMO, 3GPP TSG RAN WG1 Meeting #61, R1-103253, "Intra-cell CSI-RS design," Montreal, Canada, May 10-14, 2010, pp. 1-7.
3GPP TS 36.213 V8.8.0, 3rd Generation Partnership Project;Technical Specification Group Radio Access Network; Evolved Universal Terrestrial Radio Access (E-UTRA); Physical layer procedures (Release 8), Technical Specification, (Sep. 2009).
3GPP TS 36.306 V8.5.0, 3rd Generation Partnership Project;Technical Specification Group Radio Access Network; Evolved Universal Terrestrial Radio Access (E-UTRA); User Equipment (EU) radio access capabilities (Release 8), Technical Specification, (Sep. 2009).
3GPP TS 36.306 V9.2.0, 3rd Generation Partnership Project;Technical Specification Group Radio Access Network; Evolved Universal Terrestrial Radio Access (E-UTRA); User Equipment (UE) radio access capabilities (Release 9), Technical Specification, (Jun. 2010.
3GPP TS 36.331 V8.8.0, 3rd Generation Partnership Project;Technical Specification Group Radio Access Network; Evolved Universal Terrestrial Radio Access (E-UTRA); Radio Resource Control (RRC); Protocol specification (Release 8), Technical Specification, (Dec. 2009).
3GPP TS 36.331 V9.3.0, 3rd Generation Partnership Project;Technical Specification Group Radio Access Network; Evolved Universal Terrestrial Radio Access (E-UTRA); Radio Resource Control (RRC); Protocol specification (Release 9), Technical Specification, (Jun. 2010).
3GPP TSG RAN WG1 #56, R1-090619, "DL RS Designs for Higher Order MIMO", Samsung, Agenda item: 12.4, Feb. 9-13, 2009.
International Search Report, dated Sep. 27, 2011, issued in PCT/JP2011/069759.
Nokia et al., "CSI-RS Design for LTE-Advanced Downlink", 3GPP TSG RAN WG1 Meeting #56-bis, Seoul, Korea, Mar. 23-27, 2009, Mobile Competence Centre, 650, Route des Lucioles, F-06921 Sophia-Antipolis Cedex, France, no. Seoul, Korea, Mar. 18, 2009, XP050338944, 8 pages.
Huawei et al., 3GPP TSG-RAN2 Meeting #70, Montreal, Canada, May 10-14, 2010, R2-103463, pp. 2-3.
Huawei, "DCI for Rel-10 Downlink MIMO", 3GPP TSG RAN WG1 Meeting #62, Madrid, Spain, Aug. 23-27, 2010, R1-104506, pp. 2-5.
NTT DOCOMO et al., "UE Category for Rel. 10", 3GPP TSG RAN WG1 Meeting #62, Madrid, Spain, Aug. 23-27, 2010, R1-104944, pp. 1-5.

* cited by examiner

FIG.1

| MOBILE TERMINAL CAPABILITY INFORMATION | | PARAMETER |
|---|---|---|
| MOBILE TERMINAL CATEGORY | | 1, 2, 3, 4, 5, 6, 7, 8 |
| DL INFORMATION | CARRIER AGGREGATION INFORMATION (NUMBER OF CCs/BANDWIDTH) | 1/20MHz, 2/10+10MHz, 2/20+20MHz, 2/10+20MHz |
| | MAXIMUM NUMBER OF SPATIAL MULTIPLEXING | 1, 2, 4, 8 |
| | STATE OF SUPPORT FOR CHANNEL-STATE-MEASUREMENT REFERENCE SIGNALS FOR 8 ANTENNA PORTS | 0, 1 |
| UL INFORMATION | CARRIER AGGREGATION INFORMATION (NUMBER OF CCs/BANDWIDTH) | 1/20MHz, 2/10+10MHz, 2/20+20MHz, 2/10+20MHz |
| | MAXIMUM NUMBER OF SPATIAL MULTIPLEXING | 1, 2, 4 |

FIG.2

| MOBILE TERMINAL CATEGORY | MAXIMUM DATA RATE (DL/UL) [Mbps] | MAXIMUM NUMBER OF SPATIAL MULTIPLEXING FOR DL |
|---|---|---|
| CATEGORY 1 | 10/5 | 1 |
| CATEGORY 2 | 50/25 | 2 |
| CATEGORY 3 | 100/50 | 2 |
| CATEGORY 4 | 150/50 | 2 |
| CATEGORY 5 | 300/75 | 4 |
| CATEGORY 6 | 300/50 | - |
| CATEGORY 7 | 300/150 | - |
| CATEGORY 8 | 1200/600 | - |

| NUMBER OF PORTS FOR CHANNEL-STATE-MEASUREMENT REFERENCE SIGNAL | CODEBOOK |
|---|---|
| 1, 2, 4 | CODEBOOK 1 |
| 8 | CODEBOOK 2 |

FIG.6

| TRANSMISSION MODE | DCI FORMAT | PDSCH TRANSMISSION SCHEME |
|---|---|---|
| MODE 1 | 1 | SINGLE ANTENNA PORT (PORT 0) |
| MODE 2 | 1 | TRANSMISSION DIVERSITY |
| MODE 3 | 2A | LARGE DELAY CYCLIC DELAY DIVERSITY |
| MODE 4 | 2 | CLOSED-LOOP SPATIAL MULTIPLEXING |
| MODE 5 | 1D | MULTI-USER MIMO |
| MODE 6 | 1B | CLOSED-LOOP RANK=1 PRECODING |
| MODE 7 | 1 | SINGLE ANTENNA PORT (PORT 5: BEAM FORMING) |
| MODE 8 | 2B | DUAL LAYER TRANSMISSION (PORTS 7, 8) |
| MODE 9 | 2C | UP TO 8 LAYER TRANSMISSION (PORTS 7 - 14) |

FIG.7

| TRANSMISSION MODE | CODEBOOK FOR BASE STATION WITH 1, 2, 4 PORTS | CODEBOOK FOR BASE STATION WITH 8 PORTS |
|---|---|---|
| MODE 1 | - | - |
| MODE 2 | - | - |
| MODE 3 | - | - |
| MODE 4 | CODEBOOK 1 | CODEBOOK 1 |
| MODE 5 | CODEBOOK 1 | CODEBOOK 1 |
| MODE 6 | CODEBOOK 1 | CODEBOOK 1 |
| MODE 7 | - | - |
| MODE 8 | CODEBOOK 1 | CODEBOOK 1 |
| MODE 9 | CODEBOOK 1 | CODEBOOK 2 |

FIG.8

| MOBILE TERMINAL CAPABILITY INFORMATION | | PARAMETER |
|---|---|---|
| MOBILE TERMINAL CATEGORY | | 1, 2, 3, 4, 5, 6, 7, 8 |
| DL INFORMATION | CARRIER AGGREGATION INFORMATION(NUMBER OF CCs/BANDWIDTH) | 1/20MHz, 2/10+10MHz, 2/20+20MHz, 2/10+20MHz |
| | MAXIMUM NUMBER OF SPATIAL MULTIPLEXING | 1, 2, 4, 8 |
| UL INFORMATION | CARRIER AGGREGATION INFORMATION(NUMBER OF CCs/BANDWIDTH) | 1/20MHz, 2/10+10MHz, 2/20+20MHz, 2/10+20MHz |
| | MAXIMUM NUMBER OF SPATIAL MULTIPLEXING | 1, 2, 4 |

FIG.9

| MAXIMUM NUMBER OF SPATIAL MULTIPLEXING FOR DOWNLINK | CODEBOOK |
|---|---|
| 1, 2, 4 | CODEBOOK 1 |
| 8 | CODEBOOK 2 |

FIG.10

| MOBILE TERMINAL CATEGORY | CODEBOOK |
|---|---|
| 1, 2, 3, 4, 5, 6, 7 | CODEBOOK 1 |
| 8 | CODEBOOK 2 |

TERMINAL DEVICE, BASE STATION DEVICE, COMMUNICATION SYSTEM, AND COMMUNICATION METHOD

TECHNICAL FIELD

The present invention relates to a terminal device, a base station device, a communication system, and a communication method.

BACKGROUND ART

In a radio communication system such as WCDMA (Wideband Code Division Multiple Access), LTE (Long Term Evolution), LTE-A (LTE-Advanced), and WiMAX (Worldwide Interoperability for Microwave Access) specified by the 3GPP (Third Generation Partnership Project), a base station and a mobile terminal each have a plurality of transmission/reception antennas and the MIMO (Multi Input Multi Output) technique is used to enable high-speed data transmission between the base station and the mobile terminal to be implemented.

In this radio communication system, a reference signal for measuring the channel state (hereinafter channel-state-measurement reference signal) that is configured as a signal commonly known to the base station and the mobile terminal is used to estimate the state of the channel between the base station and the mobile terminal. Based on the result of the estimation, the radio communication system adaptively controls the modulation scheme and the code rate (MCS (Modulation and Coding Scheme)), the number of spatial multiplexing (the number of layers, the number of ranks), the weight of precoding (precoding matrix, precoder), and the like, to thereby enable more efficient data transmission to be implemented. As this control, for example, the method described in NPL 1 may be used.

Figure 11:
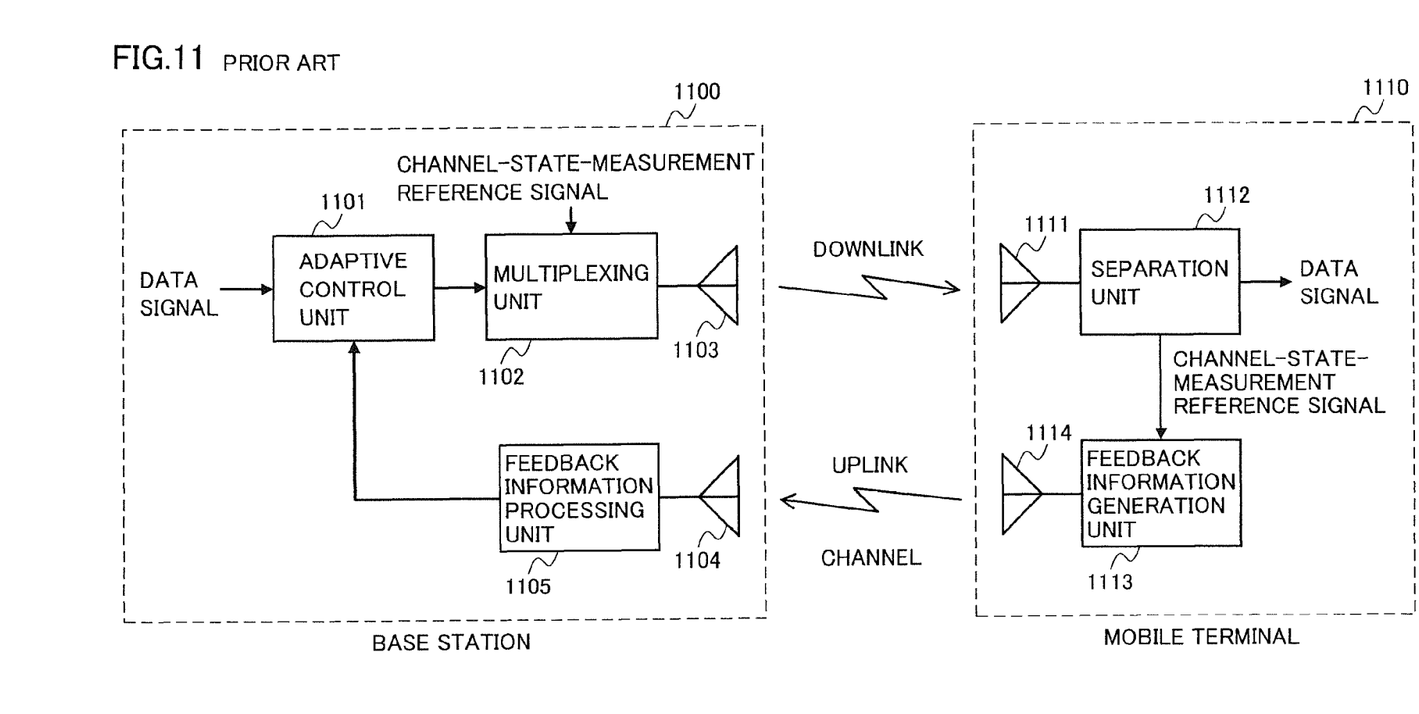
FIG. 11 is a block diagram showing an example where adaptive control is performed in the case of a downward channel (downlink, downward link) for transmitting data from a base station to a mobile terminal.

FIG. 11 is a block diagram showing an example where adaptive control is performed in the case of a downward channel (downlink) for transmitting data from a base station 1100 to a mobile terminal 1110.

In base station 1100, a multiplexing unit 1102 first multiplexes a channel-state-measurement reference signal (CSI-RS (Channel State Information-Reference Signal), pilot signal, known signal), which is specific to the base station, on a data signal for mobile terminal 1110 or a data signal addressed to another mobile terminal. Multiplexing unit 1102 transmits, from a transmission antenna 1103, the signal generated by multiplexing. In mobile terminal 1100, a separation unit 1112 separates the channel-state-measurement reference signal from the signal received by a reception antenna 1111. A feedback information generation unit 1113 generates feedback information based on the channel-state-measurement reference signal. Feedback information generation unit 1113 transmits the generated feedback information from a transmission antenna 1114 to base station 1100 through an upward channel (uplink, upward link). In base station 1100, a feedback information processing unit 1105 identifies the feedback information transmitted by mobile terminal 1110, from the signal received by a reception antenna 1104, and processes the identified feedback information. An adaptive control unit 1101 performs adaptive control on the data signal for mobile terminal 1110, based on the received feedback information.

Regarding the radio communication system, in an area covered by the base station, there are mobile terminals having a variety of capabilities (performance, ability). Therefore, the base station can know the capability of the mobile terminal (mobile terminal capability) to thereby enable this mobile terminal to be accommodated. As such a control method, the method described in NPL 2 may be used.

Figure 12:
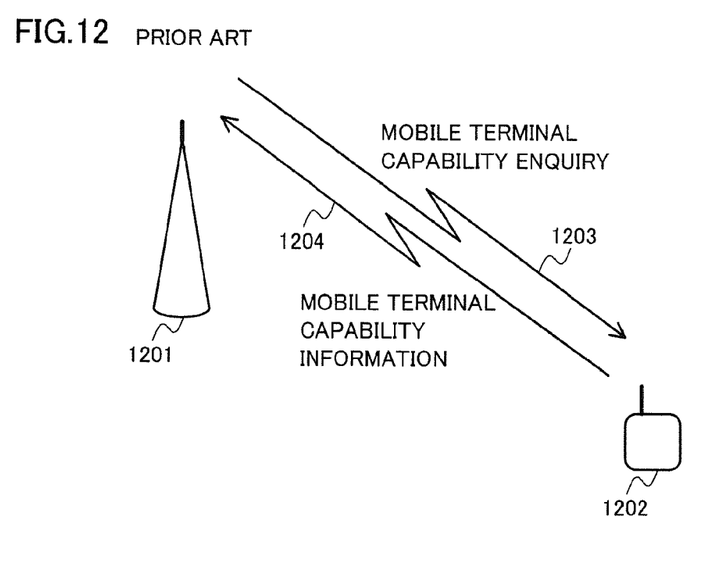
FIG. 12 is a diagram showing an example of control under which a mobile terminal reports a mobile terminal capability to a base station.

FIG. 12 is a diagram showing an example of control under which a mobile terminal reports a mobile terminal capability to a base station. A base station 1201 conveys a mobile terminal capability enquiry (UECapabilityEnquiry) 1203 to a mobile terminal 1202 through RRC (Radio Resource Control) signaling or the like. Mobile terminal 1202 conveys mobile terminal capability information (UECapabilityInformation) 1204 to base station 1201 through RRC signaling. As the mobile terminal capability information, the information described in NPL 3 for example may be used.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 8), September 2009, 3GPP TS 36.213 V8.8.0 (2009-9)

NPL 2: 3rd Generation Partnership Project; Technical Specification Group Radio Access Network; Evolved Universal Terrestrial Radio Access (E-UTRA) Radio Resource Control (RRC); Protocol specification (Release 8), December 2009, 3GPP TS 36.331 V8.8.0 (2009-12)

NPL 3: 3rd Generation Partnership Project; Technical Specification Group Radio Access Network; Evolved Universal Terrestrial Radio Access (E-UTRA) User Equipment (UE) radio access capabilities (Release 8), September 2009, 3GPP TS 36.306 V8.5.0 (2009-09)

SUMMARY OF INVENTION

Technical Problem

As for the conventional communication system, however, in the case where a precoding matrix is defined by multiple different codebooks, a codebook supported by a mobile terminal cannot be shared by the base station and the mobile terminal. It is therefore difficult for the conventional communication system to designate and apply an appropriate precoder. Thus, the fact that a codebook supported by the mobile terminal cannot be shared by the base station and the mobile terminal has been a factor that hinders improvements of the transmission efficiency.

The present invention has been made in view of the problem above, and an object of the invention is to provide a terminal device, a base station device, a communication system, and a communication method by which a codebook supported by the mobile terminal can be shared by the base station and the mobile terminal, in the communication system in which the base station and the mobile terminal communicate with each other where a precoding matrix is defined by multiple different codebooks.

Solution to Problem (1) The present invention has been made to solve the above problem. A terminal device according to an aspect of the present invention is a terminal device communicating with a base station device, and the terminal device reports to the base station device information indicating a codebook supported by the terminal device, among a plurality of codebooks.

(2) A terminal device according to an aspect of the present invention is the above terminal device, and the terminal device explicitly reports to the base station device the information indicating a codebook supported by the terminal device.

(3) A terminal device according to an aspect of the present invention is the above terminal device, and the terminal device implicitly reports to the base station device the information indicating a codebook supported by the terminal device.

(4) A terminal device according to an aspect of the present invention is the above terminal device, and the terminal device reports, to the base station device, the information indicating a codebook supported by the terminal device, by means of terminal device capability information indicating the communication ability of the terminal device.

(5) A base station device according to an aspect of the present invention is a base station device of a communication system in which the base station device and a terminal device communicate with each other, and the base station device determines a transmission mode based on information, reported by the terminal device, indicating a codebook supported by the terminal device, among a plurality of codebooks.

(6) A communication system according to an aspect of the present invention is a communication system in which a base station device and a terminal device communicate with each other, and the terminal device reports to the base station device information indicating a codebook supported by the terminal device, among a plurality of codebooks, and the base station device determines a transmission mode based on the information.

(7) A communication method according to an aspect of the present invention is a communication method for a terminal device communicating with a base station device, and the method includes the step of reporting, by the terminal device to the base station device, information indicating a codebook supported by the terminal device, among a plurality of codebooks.

(8) A communication method according to an aspect of the present invention is a communication method for a base station device of a communication system in which the base station device and a terminal device communicate with each other, and the method includes the step of determining, by the base station device, a transmission mode based on information indicating a codebook supported by the terminal device, among a plurality of codebooks, the information being reported from the terminal device.

(9) A communication method according to an aspect of the present invention is a communication method for a communication system in which a base station device and a terminal device communicate with each other, and the method includes the step of reporting, by the terminal device to the base station device, information indicating a codebook supported by the terminal device, among a plurality of codebooks, and the step of determining, by the base station device, a transmission mode based on the information.

Advantageous Effects of Invention

In accordance with the present invention, a codebook supported by a mobile terminal can be shared by the base station and the mobile terminal.

DESCRIPTION OF EMBODIMENTS

First Embodiment

In the following, a first embodiment of the present invention will be described. A communication system of the first embodiment includes a base station (base station device, transmitter, cell, transmission point, a group of transmission antennas, a group of transmission antenna ports, component carrier, eNodeB, first transmission device), and a mobile terminal (terminal device, reception point, reception terminal, receiver, second communication device, a group of reception antennas, a group of reception antenna ports, UE (User Equipment)).

In the communication system of the first embodiment, the base station first conveys a mobile terminal capability enquiry (terminal device capability enquiry, UE capability enquiry, UECapabilityEnquiry) to the mobile terminal to thereby instruct the mobile terminal to transmit mobile terminal capability information (terminal device capability information, UE capability information, UECapabilityInformation) to the base station. Based on the mobile terminal capability enquiry from the base station, the mobile terminal transmits the mobile terminal capability information to the base station.

Figure 1:
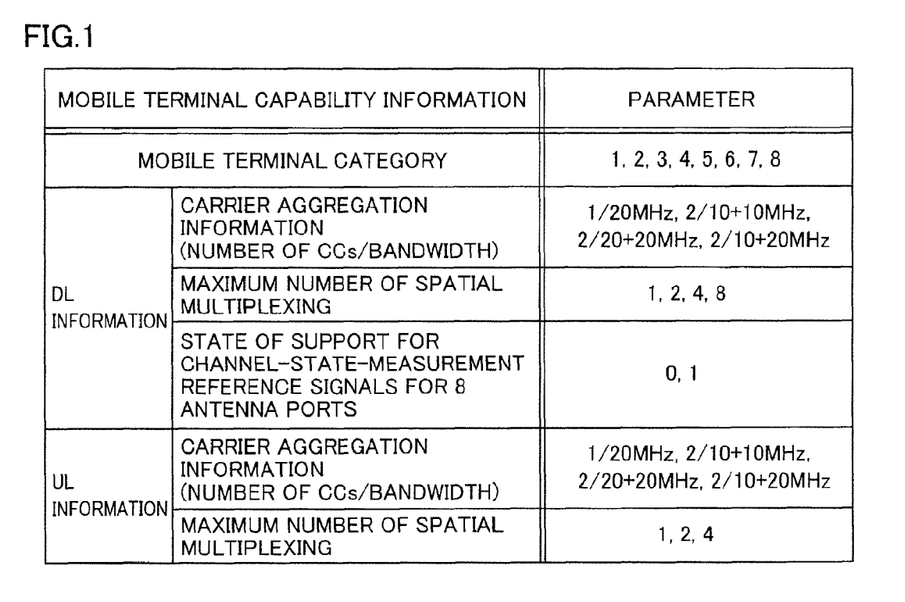
FIG. 1 shows an example of mobile terminal capability information used for a first embodiment of the present invention.

FIG. 1 shows an example of the mobile terminal capability information used for the first embodiment of the present invention. Referring to FIG. 1, the mobile terminal capability information is configured to include a mobile terminal category, carrier aggregation information for the downlink (DL), the maximum number of spatial multiplexing for the downlink, the state of support for channel-state-measurement reference signals for eight antenna ports for the downlink, carrier aggregation information for the uplink (UL), and the maximum number of spatial multiplexing for the uplink.

Figure 2:
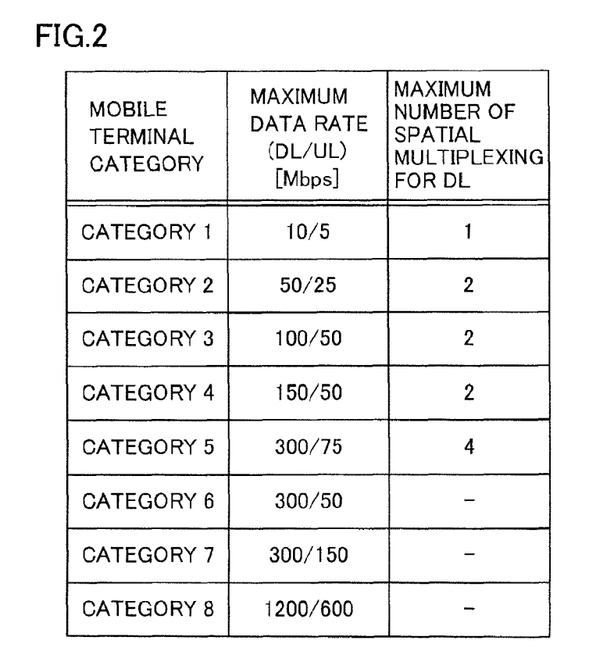
FIG. 2 shows an example of mobile terminal categories used for the first embodiment of the present invention.

FIG. 2 shows an example of mobile terminal categories used for the first embodiment of the present invention. Referring to FIG. 2, a mobile terminal category is configured to include the maximum data rate of the downlink, the maximum data rate of the uplink, and the maximum number of spatial multiplexing for the downlink. The mobile terminal categories shown in FIG. 2 include eight mobile terminal categories defined by parameters such as the maximum number of bits of a data signal which can be received per unit time, and the maximum number of spatial multiplexing. In the case where the mobile terminal is any of mobile terminal categories 6 to 8, the mobile terminal does not use the mobile terminal category but use the mobile terminal capability shown in FIG. 1 for reporting the maximum number of spatial multiplexing for the downlink.

The carrier aggregation information for the downlink and that for the uplink shown in FIG. 1 are composed respectively of a combination of the number of component carriers to be aggregated (collected, grouped) and the frequency bandwidth (system bandwidth) of each component carrier for the downlink and a combination thereof for the uplink. By the carrier aggregation information, a combination (parameter) thereof with which the mobile terminal can perform transmission/reception is indicated. As specific information, for example, information in the form of a bitmap corresponding to each combination, a method according to which one maximum parameter with which the mobile terminal can perform transmission/reception is selected, or the like may be used. The number of component carriers and the frequency bandwidth may be parameters respectively independent of each other.

The maximum number of spatial multiplexing for the downlink and that for the uplink indicate the maximum number of spatial multiplexing that can be transmitted/received in the downlink and the uplink by the mobile terminal. The maximum number of spatial multiplexing for the downlink indicated in the mobile terminal capability information is used in the case where the mobile terminal category is 6 to 8 shown in FIG. 2. Namely, in the case where the mobile terminal category is 1 to 5 shown in FIG. 2, the mobile terminal does not have to report the maximum number of spatial multiplexing for the downlink indicated in the mobile terminal capability information. However, even in the case where the mobile terminal category is 1 to 5 shown in FIG. 2, the mobile terminal may report the maximum number of spatial multiplexing for the downlink indicated in the mobile terminal capability information. In this case, the base station may preferentially select one of the maximum number of spatial multiplexing for the downlink indicated by the mobile terminal capability information and the maximum number of spatial multiplexing for the downlink indicated by the mobile terminal category.

The state of support for channel-state-measurement reference signals for eight antenna ports for the downlink as shown in FIG. 1 (whether or not antenna ports 15 to 22 are supported) is information indicating whether or not the mobile terminal supports channel-state-measurement reference signals for eight antenna ports. The antenna port is also referred to as "resource grid." For example, in the case where the mobile terminal supports the channel-state-measurement reference signals for eight antenna ports, the state of support for channel-state-measurement reference signals for eight antenna ports is represented by "1." In the case where the mobile terminal does not support the channel-state-measurement reference signals for eight antenna ports, the state of support for channel-state-measurement reference signals for eight antenna ports is represented by "0."

In the following, effects will be described that are obtained by reporting the state of support for channel-state-measurement reference signals for eight antenna ports from the mobile terminal to the base station.

Figure 3:
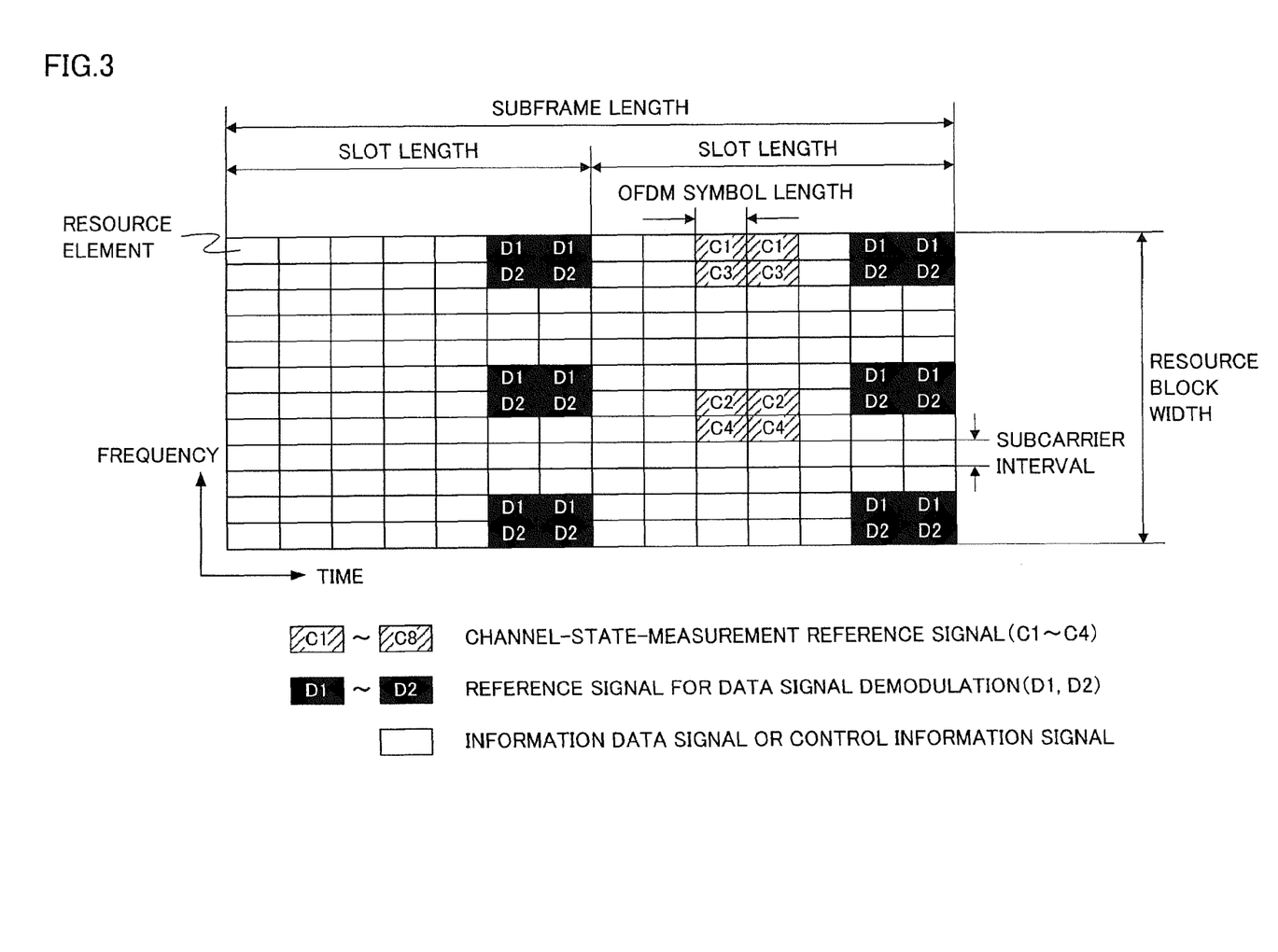
FIG. 3 is a diagram showing a pair of resource blocks to which channel-state-measurement reference signals for eight antenna ports are mapped.

FIG. 3 is a diagram showing a pair of resource blocks to which channel-state-measurement reference signals for eight antenna ports are mapped. Specifically, FIG. 3 shows the case where channel-state-measurement reference signals are mapped when the number of antenna ports (the number of CSI ports) of the base station is eight. FIG. 3 also shows two resource blocks in one subframe. Referring to FIG. 3, one pair of resource blocks is configured. One resource block is constituted of 12 subcarriers in the frequency direction and seven OFDM symbols in the time direction. In one OFDM symbol, each subcarrier is also referred to as "resource element." In each subframe, a set of seven OFDM symbols and another set of seven OFDM symbols that are consecutive in time are each also referred to as "slot."

Here, the base station can change the number of resource blocks depending on the frequency bandwidth (system bandwidth) used by the communication system. For example, the base station can use 6 to 110 resource blocks. Furthermore, the base station can apply the carrier aggregation (frequency aggregation) so that the total system bandwidth is constituted of 110 or more resource blocks. Usually, the base station may use 100 resource blocks to constitute a component carrier and aggregate five component carriers with guard bands interposed between the component carriers so that the total system bandwidth is constituted of 500 resource blocks. In terms of the frequency bandwidth, the base station may, for example, constitute a component carrier of 20 MHz and aggregate five component carriers with guard bands interposed between the component carriers so that the total system bandwidth is 100 MHz.

Of the colored (painted out or hatched) resource elements in FIG. 3, reference signals for data signal demodulation with CDM group numbers 1 to 2 are represented by D1 to D2 respectively, and channel-state-measurement reference signals with CDM group numbers 1 to 4 are represented by C1 to C4 respectively. To the resource elements other than the resource elements to which these reference signals are mapped, information data signals or control information signals are mapped.

For the channel-state-measurement reference signals of each CDM group, two-chip orthogonal codes (Walsh codes) are used. To each orthogonal code, a CSI port (port (antenna port, resource grid) for the channel-state-measurement reference signal) is allocated. The channel-state-measurement reference signals are code-division-multiplexed (CDM: Code Division Multiplexing) for every two CSI ports. Furthermore, the channel-state-measurement reference signals of each CDM group are frequency-division-multiplexed. Four CDM groups are used to map channel-state-measurement reference signals for eight antenna ports of CSI ports 1 to 8 (antenna ports 15 to 22). For example, for CDM group C1 of channel-state-measurement reference signals, channel-state-measurement reference signals for CSI ports 1 and 2 (antenna ports 15 and 16) are code-division-multiplexed so that channel-state-measurement reference signals for eight antenna ports are mapped. For CDM group C2 of channel-state-measurement reference signals, channel-state-measurement reference signals for CSI ports 3 and 4 (antenna ports 17 and 18) are code-division-multiplexed so that channel-state-measurement reference signals for eight antenna ports are mapped. For CDM group C3 of channel-state-measurement reference signals, channel-state-measurement reference signals for CSI ports 5 and 6 (antenna ports 19 and 20) are code-divisionmultiplexed so that channel-state-measurement reference signals for eight antenna ports are mapped. For CDM group C4 of channel-state-measurement reference signals, channel-state-measurement reference signals for CSI ports 7 and 8 (antenna ports 21 and 22) are code-division-multiplexed so that channel-state-measurement reference signals for eight antenna ports are mapped.

In the case where the number of antenna ports of the base station is eight, the communication system can have up to eight layers (ranks, layers for spatial multiplexing, DMRS ports) for an information data signal or control information signal. For example, the communication system can have two layers for the information data signal and one layer for the control information signal. As the reference signal for data signal demodulation of each CDM group, two-chip or four-chip orthogonal signals are used depending on the number of layers, and code division multiplexing CDM is performed for every two layers or four layers. Furthermore, a reference signal for data signal demodulation of each CDM group is frequency-division-multiplexed. Two CDM groups are used to map reference signals for data signal demodulation of eight layers of DMRS ports 1 to 8 (antenna ports 7 to 14).

Figure 4:
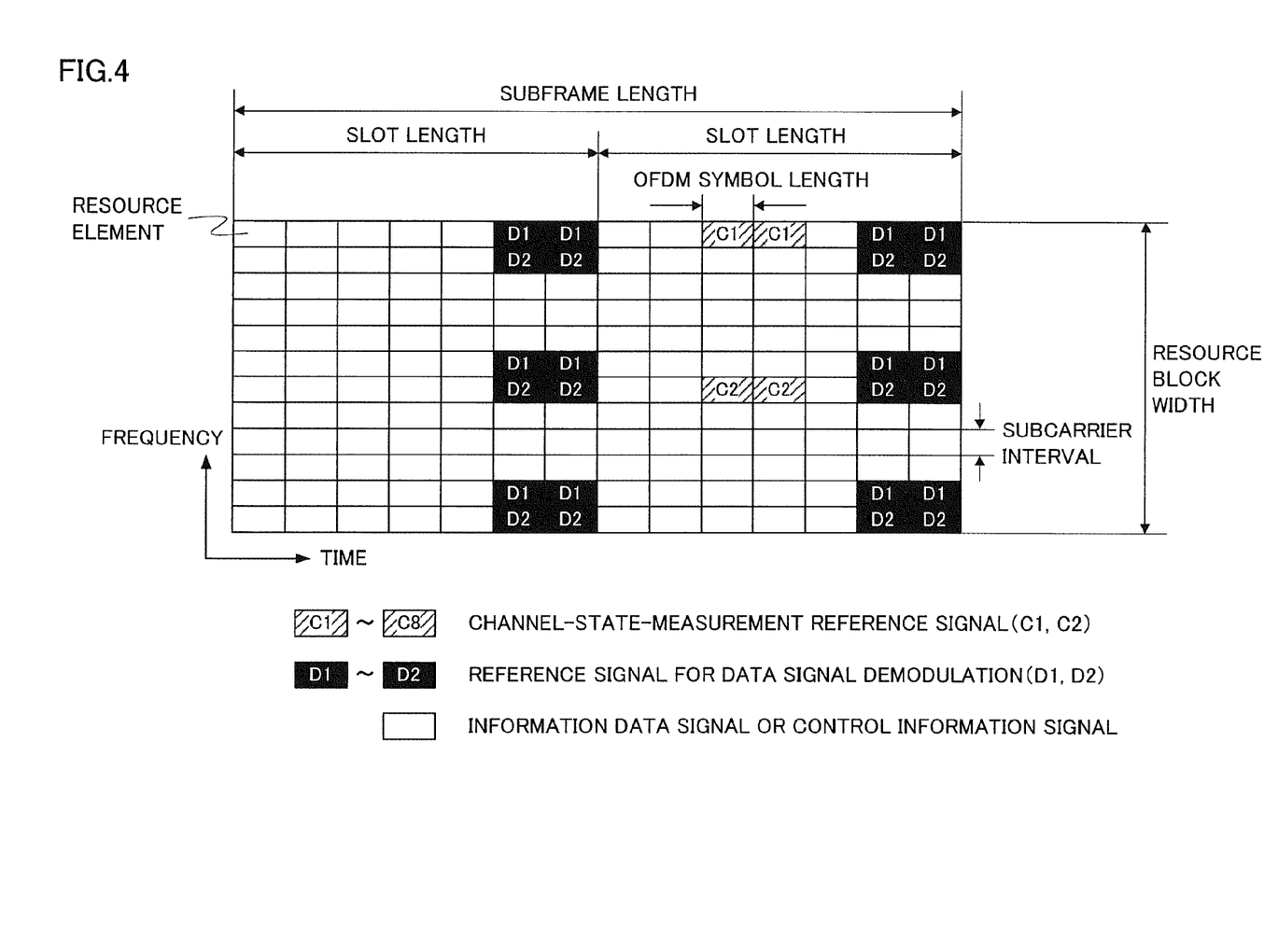
FIG. 4 is a diagram showing a pair of resource blocks to which channel-state-measurement reference signals for four antenna ports are mapped.

FIG. 4 is a diagram showing a pair of resource blocks to which channel-state-measurement reference signals for four antenna ports are mapped. Specifically, FIG. 4 shows the case where channel-state-measurement reference signals are mapped when the number of antenna ports of the base station is four.

Of the colored (painted out or hatched) resource elements in FIG. 4, reference signals for data signal demodulation with CDM group numbers 1 to 2 are represented by D1 to D2 respectively, and channel-state-measurement reference signals with CDM group numbers 1 to 2 are represented by C1 to C2 respectively. To the resource elements other than the resource elements to which these reference signals are mapped, information data signals or control information signals are mapped.

For the channel-state-measurement reference signals of each CDM group, two-chip orthogonal codes (Walsh codes) are used. To each orthogonal code, a CSI port is allocated. The channel-state-measurement reference signals are code-division-multiplexed for every two CSI ports. Furthermore, the channel-state-measurement reference signals of each CDM group are frequency-division-multiplexed. Two CDM groups are used to map channel-state-measurement reference signals for four antenna ports of CSI ports 1 to 4 (antenna ports 15 to 18). For example, for CDM group C1 of channel-state-measurement reference signals, channel-state-measurement reference signals for CSI ports 1 and 2 (antenna ports 15 and 16) are code-division-multiplexed so that channel-state-measurement reference signals for four antenna ports are mapped. For CDM group C2 of channel-state-measurement reference signals, channel-state-measurement reference signals for CSI ports 3 and 4 (antenna ports 17 and 18) are code-division-multiplexed so that channel-state-measurement reference signals for four antenna ports are mapped.

In the case where the number of antenna ports of the base station is four, the communication system can have up to four layers for an information data signal or control information signal. As the reference signal for data signal demodulation of each CDM group, two-chip orthogonal signals are used depending on the number of layers, and code division multiplexing is performed for every two layers. Furthermore, a reference signal for data signal demodulation of each CDM group is frequency-division-multiplexed. Two CDM groups are used to map reference signals for data signal demodulation of four layers of DMRS ports 1 to 4 (antenna ports 7 to 10).

The base station can transmit, to the mobile terminal, channel-state-measurement reference signals when the number of antenna ports is one or two. The base station can transmit, to the mobile terminal, channel-state-measurement reference signals for one antenna port or two antenna ports, using CDM group C1 of channel-state-measurement reference signals shown in FIG. 3 or 4.

The mobile terminal uses the channel-state-measurement reference signals transmitted by the base station to measure the state of the channel between the base station and the mobile terminal and thereby generate feedback information for implementing adaptive control of the mobile terminal by the base station. The mobile terminal feeds back (reports) the generated feedback information to the base station.

In particular, the mobile terminal can generate a precoding matrix for the base station to perform precoding processing on an information data signal addressed to the mobile terminal. Precoding processing is performed for the base station to transmit the information data signal to the mobile terminal in an optimum manner. Precoding processing is performed, for example, for the purpose of facilitating separation of the spatially multiplexed information data signal by the mobile terminal, and for optimizing (maximizing) the reception power for the information data signal received by the mobile terminal (SNR: Signal to Noise power Ratio, SINR: Signal and Interference to Noise power Ratio).

In order to reduce overhead of the feedback information which is fed back by the mobile terminal, the precoding matrix is defined in the form of a codebook in advance. Thus, the base station and the mobile terminal can share a plurality of predefined precoding matrices. Accordingly, the mobile terminal can select a suitable precoding matrix from the defined codebooks and feed back the index of the selected codebook as PMI (Precoding Matrix Indicator).

Figure 5:
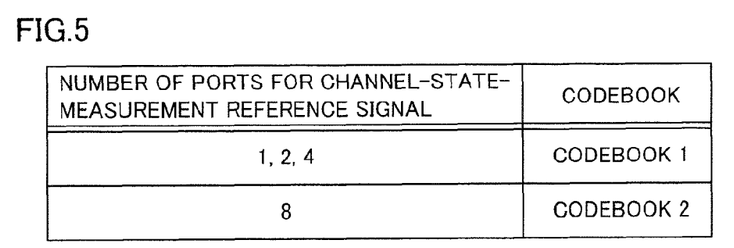
FIG. 5 is a diagram showing an example of codebooks defined depending on the number of ports for channel-state-measurement reference signals.

As to the above-described codebook, more than one codebook can be defined. For example, codebooks can be defined depending on the number of ports for channel-state-measurement reference signals. FIG. 5 is a diagram showing an example of codebooks defined depending on the number of ports for channel-state-measurement reference signals. Referring to FIG. 5, when the number of ports for channel-state-measurement reference signals is 1, 2, or 4, codebook 1 (first codebook) is used. When the number of ports for channel-state-measurement reference signals is eight, codebook 2 (second codebook) is used.

At this time, each codebook can be defined for various purposes or reasons. For example, as codebook 1, in order to keep the backward compatibility with the radio communication system (LTE for example) running with the number of ports of 1, 2, or 4 for channel-state-measurement reference signals, the codebook defined for this radio communication system can be reused. As codebook 2, a codebook defined for a radio communication system for which it is unnecessary to take into consideration the backward compatibility with the radio communication system running with the number of ports of 1, 2, or 4 for channel-state-measurement reference signals can be used. For example, codebook 1 can be defined based on a codebook which is most suitable for the SU-MIMO (Single User-MIMO). Codebook 2 can be defined based on a codebook which is most suitable for the MU-MIMO (Multi User-MIMO) or high-rank SU-MIMO.

Here, in the case where multiple different codebooks are defined for the radio communication system (specifically in the case as shown in FIG. 5 where codebooks are defined depending on the number of ports for channel-state-measurement reference signals), the mobile terminal has to hold all of the defined codebooks. Namely, regardless of the maximum number of ports for channel-state-measurement reference signals that the mobile terminal can receive, the mobile terminal has to hold all of the defined codebooks.

The mobile terminal can overcome this problem by reporting, to the base station, mobile terminal capability information, namely whether or not the mobile terminal supports channel-state-measurement reference signals for eight antenna ports. Specifically, a mobile terminal which does not support the channel-state-measurement reference signals for eight antenna ports can report to the base station the mobile terminal capability information as "0" which represents the fact that the mobile terminal does not support channel-state-measurement reference signals for eight ports, and accordingly eliminate the need to hold codebook 2 shown in FIG. 5, and thus hold only codebook 1. Accordingly, the storage capacity of the mobile terminal can be reduced. Moreover, the processing by the mobile terminal can be reduced. In addition, the base station can reduce scheduling processing and handover processing for mobile terminals including the above mobile terminal.

A mobile terminal supporting channel-state-measurement reference signals for eight antenna ports reports to the base station the mobile terminal capability information as "1" which represents the fact that the mobile terminal supports channel-state-measurement reference signals for eight ports. At this time, while it is preferable that the mobile terminal holds codebook 1 and codebook 2, it may hold only codebook 2.

In the case where the mobile terminal reports to the base station "0" representing the fact that the mobile terminal does not support channel-state-measurement reference signals for eight antenna ports, the base station can set, for the mobile terminal, a transmission scheme (transmission mode) other than the transmission scheme for transmission of up to eight layers. For example, the base station can set, for the mobile terminal, a transmission scheme (transmission mode) that is used by a radio communication system running with the number of ports of 1, 2, or 4 for channel-state-measurement reference signals.

In the case where the mobile terminal reports to the base station "1" representing the fact that the mobile terminal supports channel-state-measurement reference signals for eight antenna ports, the base station can set, for this mobile terminal, a transmission scheme (transmission mode) including the transmission scheme for transmission of up to eight layers.

Figure 6:
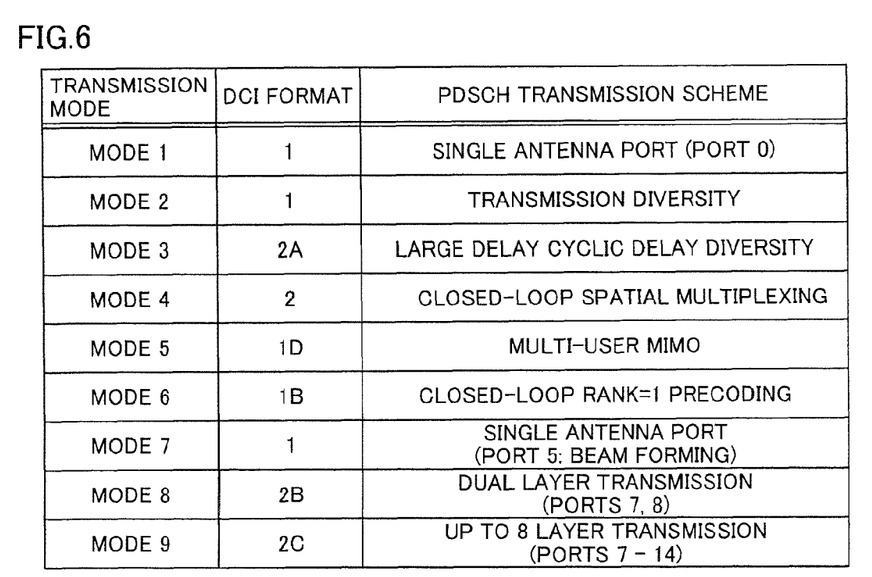
FIG. 6 is a diagram showing an example of transmission modes used for the first embodiment of the present invention.

FIG. 6 is a diagram showing an example of transmission modes used for the first embodiment. Of the transmission modes shown in FIG. 6, only codebook 1 is used for transmission modes 4, 5, 6, and 8 which feed back PMI, and codebook 1 or codebook 2 is used for transmission mode 9. For each transmission mode, a format of a control information signal (DCI (Downlink Control Information) format) corresponding to the transmission mode is defined. The communication system may also define only codebook 2 for transmission mode 9.

At this time, in the case where the mobile terminal reports to the base station "0" representing the fact that the mobile terminal does not support channel-state-measurement reference signals for eight antenna ports, the base station can set one of transmission modes 1 to 8 for this mobile terminal.

Depending on the mobile terminal category, the communication system can make a switch between the case where the mobile terminal reports whether or not it supports channel-state-measurement reference signals for eight antenna ports and the case where the mobile terminal does not report it. For example, the communication system may be configured so that, only in the case where the mobile terminal category is one of 1 to 7, the mobile terminal reports whether or not it supports channel-state-measurement reference signals for eight antenna ports.

In the case where the mobile terminal reports to the base station "1" representing the fact that the mobile terminal supports channel-state-measurement reference signals for eight antenna ports, the base station can set, for this mobile terminal, one of transmission modes 1 to 9.

Figure 7:
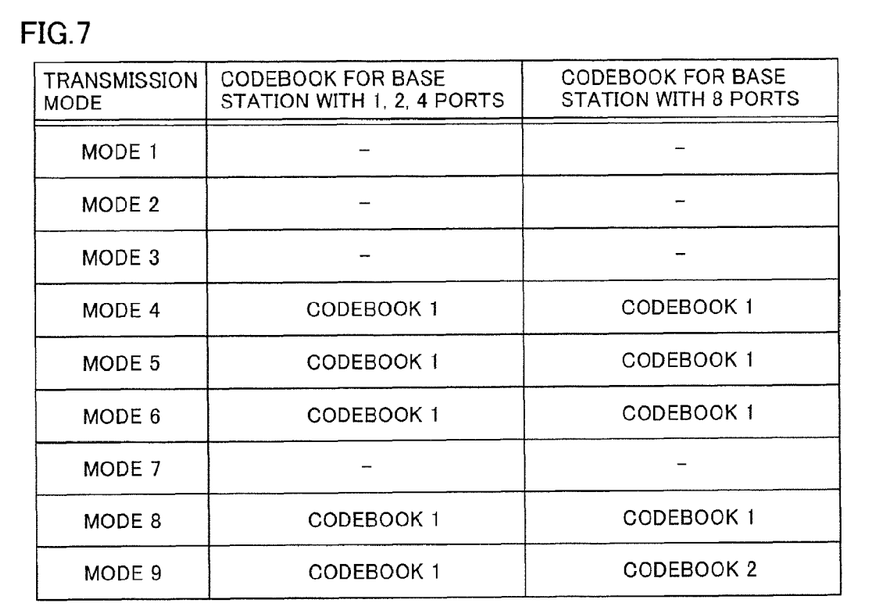
FIG. 7 is a diagram showing an example of codebooks defined depending on the number of ports for channel-state-measurement reference signals and the transmission mode.

Moreover, the communication system can define, in addition to the number of ports for channel-state-measurement reference signals, a codebook depending on the transmission mode. FIG. 7 is a diagram showing an example of codebooks defined depending on the number of ports for channel-state-measurement reference signals and the transmission mode. For transmission modes 4, 5, 6, and 8 which feed back PMI among the transmission modes shown in FIG. 6, the mobile terminal uses codebook 1. In the case of transmission mode 9, the mobile terminal uses codebook 1 when the number of ports for channel-state-measurement reference signals is one of 1, 2, and 4, and the mobile terminal uses codebook 2 when the number of ports for channel-state-measurement reference signals is 8. The mobile terminal may include, in the mobile terminal capability information, information indicating whether or not the mobile terminal supports transmission mode 9, in addition to the information about whether or not it supports channel-state-measurement reference signals for eight antenna ports. Furthermore, the mobile terminal may joint-code each control information to provide, as control information, an index of the information obtained by this joint coding. The mobile terminal may also include, in the mobile terminal capability information, information indicating whether or not "the mobile terminal can receive channel-state-measurement reference signals for eight antenna ports and support transmission mode 9," as the state of support for transmission mode 9 and channel-state-measurement reference signals for eight antenna ports, instead of the information about whether or not the mobile terminal supports channel-state-measurement reference signals for eight antenna ports. Furthermore, the communication system can make a switch, depending on the number of ports of the base station for channel-state-measurement reference signals, between the case where the mobile terminal reports whether or not the mobile terminal supports channel-state-measurement reference signals for eight antenna ports and whether or not it supports transmission mode 9, and the case where the mobile terminal does not report them. For example, the communication system may be configured so that, only in the case where the number of ports of the base station for channel-state-measurement reference signals is eight, the mobile terminal reports whether or not it supports channel-state-measurement reference signals for eight antenna ports and whether or not it supports transmission mode 9.

The mobile terminal may include, in the mobile terminal capability information, information indicating whether or not the mobile terminal supports transmission mode 9, as the state of support for transmission mode 9, instead of whether or not the mobile terminal supports channel-state-measurement reference signals for eight antenna ports. Furthermore, the communication system may make a switch, depending on the number of ports of the base station for channel-state-measurement reference signals, the case where the mobile terminal reports whether or not it supports transmission mode 9 and the case where the mobile terminal does not report it. For example, the communication system may be configured so that, only in the case where the number of ports of the base station for channel-state-measurement reference signals is eight, the mobile terminal reports whether or not it supports transmission mode 9.

The mobile terminal may include, in the mobile terminal capability information, information indicating whether or not the mobile terminal supports DCI format 1C, as the state of support for DCI format 1C, instead of whether or not it supports channel-state-measurement reference signals for eight antenna ports. Furthermore, the communication system may make a switch, depending on the number of ports of the base station for channel-state-measurement reference signals, the case where the mobile terminal reports whether or not it supports DCI format 1C and the case where the mobile terminal does not report it. For example, the communication system may be configured so that, only in the case where the number of ports of the base station for channel-state-measurement reference signals is eight, the mobile terminal reports whether or not it supports DCI format 1C.

The mobile terminal may include, in the mobile terminal capability information, information indicating whether or not the mobile terminal supports codebook 2, as the state of support for codebook 2, instead of whether or not the mobile terminal supports channel-state-measurement reference signals for eight antenna ports. Furthermore, the communication may make a switch, depending on the number of ports of the base station for channel-state-measurement reference signals, the case where the mobile terminal reports whether or not it supports codebook 2 and the case where the mobile terminal does not report it. For example, the communication system may be configured so that, only in the case where the number of ports of the base station for channel-state-measurement reference signals is eight, the mobile terminal reports whether or not it supports codebook 2.

The mobile terminal may include, in the mobile terminal capability information, the maximum number of ports for channel-state-measurement reference signals that can receive (the maximum number of ports that can generate feedback information), instead of whether or not the mobile terminal supports channel-state-measurement reference signals for eight antenna ports. Furthermore, the communication system may make a switch, depending on the number of ports of the base station for channel-state-measurement reference signals, the case where the mobile terminal reports the maximum number of ports for channel-state-measurement reference signals that can receive and the case where the mobile terminal does not report it. For example, the communication system may be configured so that, only in the case where the number of ports of the base station for channel-state-measurement reference signals is eight, the mobile terminal reports the maximum number of ports for channel-state-measurement reference signals that can receive.

According to the description above, the mobile terminal reports, as the mobile terminal capability information, whether or not the mobile terminal supports channel-state-measurement reference signals for eight antenna ports. The present invention, however, is not limited to this. For example, the mobile terminal may report whether or not it supports channel-state-measurement reference signals for eight antenna ports, by including it in the mobile terminal category. The mobile terminal may also report whether or not it supports channel-state-measurement reference signals for eight antenna ports, by including it in PDCCH (Physical Downlink Control Channel) or a control information signal or information data signal or the like transmitted through RRC signaling.

According to the description above, the mobile terminal reports whether or not it supports channel-state-measurement reference signals for eight antenna ports, as independent control information. The present invention, however, is not limited to this. For example, the mobile terminal may also define control information generated by synthesizing the control information with another control information (namely perform joint coding), and report, to the base station, information indicating an index for the information obtained by this joint coding, as control information. For example, the mobile terminal may joint-code the information about whether or not the mobile terminal supports channel-state-measurement reference signals for eight antenna ports, with the mobile terminal category, the carrier aggregation information for the downlink, the maximum number of spatial multiplexing for the downlink, whether or not the mobile terminal supports channel-state-measurement reference signals for eight antenna ports for the downlink, the carrier aggregation information for the uplink, the maximum number of spatial multiplexing for the uplink, respective maximum data rates of the downlink and the uplink, the transmission mode, or the DCI format or the like, and report it to the base station.

As heretofore described, the mobile terminal explicitly reports the codebook supported by this mobile terminal, through the mobile terminal capability information or the like, to the base station having a precoder defined by a plurality of codebooks. Accordingly, the storage capacity of the mobile terminal can be reduced and processing by this mobile terminal can also be reduced. Furthermore, scheduling processing and handover processing for mobile terminals including the above mobile terminal can be reduced.

Second Embodiment

A second embodiment of the present invention will hereinafter be described. A communication system of the second embodiment includes a base station and a mobile terminal, similarly to the communication system of the first embodiment of the present invention. In the following, components and features different from those of the first embodiment will mainly be described.

Figure 8:
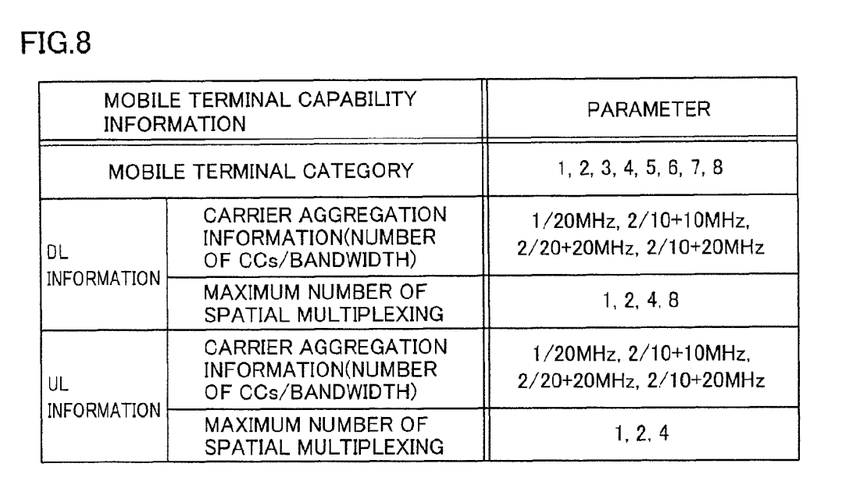
FIG. 8 shows an example of mobile terminal capability information used for a second embodiment of the present invention.

FIG. 8 shows an example of mobile terminal capability information used for the second embodiment of the present invention. The mobile terminal capability information is configured to include a mobile terminal category, carrier aggregation information for the downlink, the maximum number of spatial multiplexing for the downlink, carrier aggregation information for the uplink, and the maximum number of spatial multiplexing for the uplink.

In the second embodiment, the mobile terminal implicitly reports, to the base station, a codebook that the mobile terminal supports, by associating it with a part of the mobile terminal capability information shown in FIG. 8.

For example, the mobile terminal can report to the base station a codebook that the mobile terminal supports, by associating it with the maximum number of spatial multiplexing for the downlink, in the mobile terminal capability information shown in FIG. 8.

Figure 9:
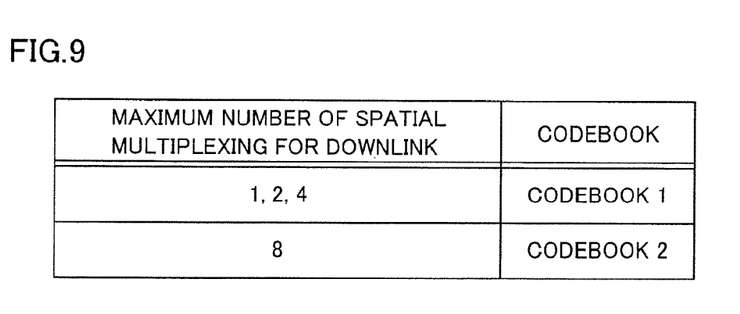
FIG. 9 is a diagram showing an example of codebooks defined depending on the maximum number of spatial multiplexing for the downlink.

FIG. 9 is a diagram showing an example of codebooks defined depending on the maximum number of spatial multiplexing for the downlink. Referring to FIG. 9, when the maximum number of spatial multiplexing for the downlink is 1, 2, or 4, codebook 1 is used. When the maximum number of spatial multiplexing for the downlink is 8, codebook 2 is used.

Accordingly, a mobile terminal for which the maximum number of spatial multiplexing for the downlink that the mobile terminal can receive is 1, 2, or 4 (namely a mobile terminal for which the maximum number of spatial multiplexing for the downlink that is reported by means of the mobile terminal capability is 1, 2, or 4) does not have to hold codebook 2. Therefore, the storage capacity of the mobile terminal can be reduced, and processing by the mobile terminal can also be reduced. Furthermore, the base station can reduce scheduling processing and handover processing for mobile terminals including the above mobile terminal.

The mobile terminal can also report to the base station a codebook that the mobile terminal supports, by associating it with the mobile terminal category of the mobile terminal capability information shown in FIG. 8, for example.

Figure 10:
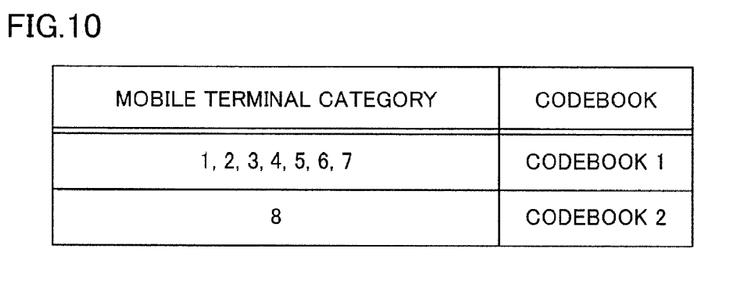
FIG. 10 is a diagram showing an example of codebooks defined depending on the mobile terminal category.

FIG. 10 is a diagram showing an example of codebooks defined depending on the mobile terminal category. Referring to FIG. 10, when the mobile terminal category is 1, 2, 3, 4, 5, 6, or 7, codebook 1 is used. When the mobile terminal category is 8, codebook 2 is used.

Accordingly, a mobile terminal with the mobile terminal category of 1, 2, 3, 4, 5, 6, or 7 (namely a mobile terminal for which the mobile terminal category reported by means of the mobile terminal capability is 1, 2, 3, 4, 5, 6, or 7) does not have to hold codebook 2. Therefore, the storage capacity of the mobile terminal can be reduced, and processing by the mobile terminal can also be reduced. Furthermore, the base station can reduce scheduling processing and handover processing for mobile terminals including the above mobile terminal.

According to the description above, the case has been described where the mobile terminal implicitly reports to the base station the codebook that the mobile terminal supports, by associating it with the maximum number of spatial multiplexing for the downlink or the mobile terminal category. The present invention, however, is not limited to this. The mobile terminal can also implicitly report to the base station, the codebook that the mobile terminal supports, by associating it with the carrier aggregation information for the downlink, the number of ports for channel-state-measurement reference signals for the downlink, the carrier aggregation information for the uplink, the maximum number of spatial multiplexing for the uplink, respective maximum data rates of the downlink and the uplink, the transmission mode, or the DCI format, for example.

According to the description above, the case has been described where the mobile terminal implicitly reports to the base station the codebook that the mobile terminal supports, by associating it with a part of the mobile terminal capability information. The present invention, however, is not limited to this. The mobile terminal may associate the codebook that the mobile terminal supports, by associating it with a part of the mobile terminal category information. The mobile terminal may also report to the base station the codebook that the mobile terminal supports, by associating it with a control information signal, information data signal, or the like, transmitted through PDCCH or RRC signaling.

As heretofore described, the mobile terminal implicitly reports the codebook supported by this mobile terminal, through the mobile terminal capability information or the like, to the base station having a precoder defined by a plurality of codebooks. Therefore, the storage capacity of the mobile terminal can be reduced, and processing by this mobile terminal can also be reduced. Furthermore, the base station can reduce scheduling processing and handover processing for mobile terminals including the above mobile terminal.

Third Embodiment

In connection with the first or second embodiment above, the description has been given of the explicit or implicit report of whether codebook 2 is supported or not in one cell. In connection with a third embodiment of the present invention, a description will be given of report of whether codebook 2 is supported by the mobile terminal or not as well as processing after this report, in the case where one mobile terminal is accommodated by cells (base stations) having respective number of antenna ports different from each other.

A mobile terminal supporting codebook 2 which is a codebook for eight antenna ports uses the mobile terminal capability information as shown in FIG. 1 to explicitly report, to the base station, that the mobile terminal supports codebook 2 which is a codebook for eight antenna ports. In contrast, a mobile terminal which does not support (have) codebook 2, which is a codebook for eight antenna ports, uses the mobile terminal capability information as shown in FIG. 1 to explicitly report, to the base station, that the mobile terminal does not support codebook 2 which is a codebook for eight antenna ports.

Alternatively, a mobile terminal supporting codebook 2, which is a codebook for eight antenna ports, uses the mobile terminal capability information as shown in FIG. 8 to implicitly report, to the base station, that the mobile terminal supports codebook 2 which is a codebook for eight antenna ports. In contrast, a mobile terminal which does not support (have) codebook 2, which is a codebook for eight antenna ports, uses the mobile terminal capability information as shown in FIG. 1 to implicitly report, to the base station, that the mobile terminal does not support codebook 2 which is a codebook for eight antenna ports.

In the case where the base station of the communication system is a base station performing transmission with 1, 2, or 4 antenna ports (constituting a cell by 1, 2, or 4 ports), the base station can use modes 4, 5, 6, 8, and 9 as transmission modes using codebook 1 as shown in FIG. 7. Since both a mobile terminal supporting codebook 2 and a mobile terminal which does not support codebook 2 can use codebook 1, the base station can set modes 4, 5, 6, 8, and 9 for both mobile terminals. Here, modes 1 to 8 are basic transmission modes and mode 9 is an extended transmission mode. The extended transmission mode is a transmission mode where the function is extended as compared with the basic transmission mode. The extended transmission mode is superior in terms of the degree of freedom in scheduling, the overhead of the control information, the maximum transmission rate, and the like.

In contrast, in the case where the base station of the communication system is a base station performing transmission with 8 antenna ports (constituting a cell by 8 ports), the base station can use modes 4, 5, 6, and 8 as transmission modes using codebook 1, and can use mode 9 as a transmission mode using codebook 2, as shown in FIG. 7. The base station can set modes 4, 5, 6, 8, and 9 for a mobile station supporting codebook 2. The base station does not set mode 9 for a mobile terminal which does not support codebook 2.

Thus, the mobile terminal explicitly or implicitly reports to the base station whether or not the mobile terminal supports codebook 2 which is a codebook for 8 antenna ports. Accordingly, for a mobile terminal which does not support codebook 2, the base station performing transmission with 1, 2, or 4 antenna ports can use mode 9. Therefore, the storage capacity of the mobile terminal can be reduced, and processing by the mobile terminal can also be reduced. Moreover, the base station can efficiently perform scheduling and handover.

It should be noted that a program for implementing the functions of the whole or a part of the base station device or the whole or a part of the terminal device for each embodiment as described above may be recorded on a computer-readable recording medium, and the program recorded on the recording medium may be read and executed by a computer system, so that processing by each component is performed. "Computer system" herein refers to a computer system including the OS (Operating System) and hardware such as peripherals.

"Computer system" also includes a homepage providing environment (or display environment), if it uses the WWW (World Wide Web) system.

"Computer-readable recording medium" refers to a storage device such as portable media like flexible disk, magneto-optical disk, ROM (Read Only Memory), CD (Compact Disc)-ROM, and hard disk built in the computer system. "Computer-readable recording medium" also includes media dynamically holding a program for a short period of time, like a communication line in the case where the program is transmitted through a network such as the Internet or a communication wire such as a telephone wire, and media holding a program for a certain time, like a volatile memory in the computer system serving as a server or a client in this case. The aforementioned program may be the one for implementing a part of the above-described functions, or the one capable of implementing the above-described functions by being combined with a program which has already been recorded in the computer system.

The functions of the whole or a part of the base station device and the whole or a part of the terminal device may be integrated into an integrated circuit and implemented. Functional blocks of the base station device and the terminal device may individually be implemented in the form of a chip, or a part or the whole thereof may be integrated into a chip. The scheme for fabricating an integrated circuit is not limited to the LSI, and may be implemented by a dedicated circuit or general-purpose processor. If the progress of the semiconductor technology provides a technology for implementing an integrated circuit which replaces the LSI, the integrated circuit based on this technology may also be used.

While the embodiments of the present invention have been described in detail with reference to the drawings, the specific configuration is not limited to the embodiments but encompasses design changes and the like to the extent that does not go beyond the essence of the present invention. The present invention can be modified in various manners within the scope defined by the claims, and embodiments obtained by appropriately combining technical means disclosed in different embodiments are also encompassed by the technical scope of the present invention. The configuration is also encompassed in which elements described in connection with the above embodiments and achieving similar effects are replaced with each other.

The present invention can also be expressed as follows.

(1) A terminal device according to an aspect of the present invention is a terminal device communicating with a base station device, characterized in that the terminal device reports to the base station device information indicating a codebook supported by the terminal device, among a plurality of codebooks. Accordingly, the base station device can use the reported information to efficiently perform scheduling and handover.

(1a) A terminal device according to an aspect of the present invention includes communication means (communication interface) for communicating with the base station device, and report control means (processor) for reporting to the base station device by means of the communication means, information indicating a codebook supported by the terminal device, among a plurality of codebooks. Accordingly, the base station device can use the reported information to efficiently perform scheduling and handover.

(2) A terminal device according to an aspect of the present invention is the above-described terminal device characterized in that the terminal device explicitly reports, to the base station device, the information indicating a codebook supported by the terminal device. Accordingly, the storage capacity of the terminal device supporting a small number of codebooks only can be reduced and processing by the terminal device can further be reduced.

(2a) The report control means explicitly reports, to the base station device, the codebook supported by the terminal device, using the communication means. Accordingly, the storage capacity of the terminal device supporting a small number of codebooks only can be reduced and processing by the terminal device can further be reduced.

(3) A terminal device according to an aspect of the present invention is the above-described terminal device characterized in that the terminal device implicitly reports, to the base station device, the information indicating a codebook supported by the terminal device. Accordingly, the storage capacity of the terminal device supporting a small number of codebooks only can be reduced and processing by the terminal device can further be reduced.

(3a) The communication means implicitly reports, to the base station device, using the communication means, the information indicating a codebook supported by the terminal device. Accordingly, the storage capacity of the terminal device supporting a small number of codebooks only can be reduced and processing by the terminal device can further be reduced.

(4) A terminal device according to an aspect of the present invention is the above-described terminal device characterized in that the terminal device reports, to the base station device, the information indicating a codebook supported by the terminal device, by means of terminal device capability information indicating the communication ability of the terminal device. Accordingly, the terminal device can efficiently report, to the base station device, the codebook that the terminal device supports.

(4a) The communication control means reports, to the base station device, using the communication means, the information indicating a codebook supported by the terminal device, by means of the communication means. Accordingly, the terminal device can efficiently report, to the base station device, the codebook that the terminal device supports.

(5) A base station device according to an aspect of the present invention is a base station device of a communication system in which the base station device and a terminal device communicate with each other, characterized in that the base station device determines a transmission mode based on information, reported by the terminal device, indicating a codebook supported by the terminal device, among a plurality of codebooks. Accordingly, the base station device can determine an efficient transmission mode.

(5a) A base station device according to an aspect of the present invention includes reception means for receiving, from a terminal device, information indicating a codebook supported by the terminal device, among a plurality of codebooks, and determination means for determining a transmission mode based on the information indicating a codebook supported by the terminal device. Accordingly, the base station device can determine an efficient transmission mode.

(6) A communication system according to an aspect of the present invention is a communication system in which a base station device and a terminal device communicate with each other, characterized in that the terminal device reports, to the base station device, information indicating a codebook supported by the terminal device, among a plurality of codebooks, and the base station device determines a transmission mode based on the information. Accordingly, the base station device can determine an efficient transmission mode.

(6a) A communication system according to an aspect of the present invention includes a base station device and a terminal device. The terminal device includes first communication means (communication interface) for communicating with the base station device, and report control means (processor) for reporting, to the base station device, by means of the first communication means, information indicating a codebook supported by the terminal device, among a plurality of codebooks. The base station device includes reception means for receiving the information indicating a codebook supported by the terminal device, and determination means for determining a transmission mode based on the information indicating a codebook supported by the terminal device. Accordingly, the base station device can determine an efficient transmission mode.

(7) A communication method according to an aspect of the present invention is a communication method for a terminal device communicating with a base station device, characterized in that it includes the step of reporting, by the terminal device to the base station device, information indicating a codebook supported by the terminal device, among a plurality of codebooks. Accordingly, the base station device can use the reported information to efficiently perform scheduling and handover.

(8) A communication method according to an aspect of the present invention is a communication method for a base station device of a communication system in which the base station device and a terminal device communicate with each other, characterized in that it includes the step of determining, by the base station device, a transmission mode based on information indicating a codebook supported by the terminal device, among a plurality of codebooks, the information being reported from the terminal device. Accordingly, the base station device can determine an efficient transmission mode.

(8a) A communication method according to an aspect of the present invention is a communication method for a base station device of a communication system in which the base station device and a terminal device communicate with each other. The communication method includes the step of receiving, by the base station device from the terminal device, information indicating a codebook supported by the terminal device, among a plurality of codebooks, and the step of determining, by the base station device, a transmission mode based on the information. Accordingly, the base station device can determine an efficient transmission mode.

(9) A communication method according to an aspect of the present invention is a communication method for a communication system in which a base station device and a terminal device communicate with each other, characterized in that it includes the step of reporting, by the terminal device to the base station device, information indicating a codebook supported by the terminal device, among a plurality of codebooks, and the step of determining, by the base station device, a transmission mode based on the information. Accordingly, the base station device can determine an efficient transmission mode.

(9a) A communication method according to an aspect of the present invention is a communication method for a communication system in which a base station device and a terminal device communicate with each other. The communication method includes the step of transmitting, by the terminal device to the base station device, information indicating a codebook supported by the terminal device, among a plurality of codebooks, the step of receiving, by the base station device, the information indicating a codebook supported by the terminal device, and the step of determining, by the base station device, a transmission mode based on the information indicating a codebook supported by the terminal device. Accordingly, the base station device can determine an efficient transmission mode.

INDUSTRIAL APPLICABILITY

The present invention is suitably applicable to radio base station devices, radio terminal devices, radio communication systems, and radio communication methods.

REFERENCE SIGNS LIST

1100 base station; 1101 adaptive control unit; 1102 multiplexing unit; 1103 transmission antenna; 1104 reception antenna; 1105 feedback information processing unit; 1110 mobile terminal; 1111 reception antenna; 1112 separation unit; 1113 feedback information generation unit; 1114 transmission antenna; 1201 base station; 1202 mobile terminal; 1203 mobile terminal capability enquiry; 1204 mobile terminal capability information

The invention claimed is:

1. A terminal apparatus which communicates with a base station apparatus, the terminal apparatus comprising:
   a transferring circuit configured and/or programmed to transfer terminal capability information to the base station apparatus, the terminal capability information indicating whether the terminal apparatus supports a PDSCH transmission mode with 8 CSI reference signal ports; and
   a reporting circuit configured to and/or programmed report a channel state information computed from a channel measurement, wherein
   the channel measurement in the PDSCH transmission mode with 8 CSI reference signal ports is based on only CSI-RS.

2. The terminal apparatus according to claim 1, wherein an up to 8 layer PDSCH transmission scheme is applicable in the PDSCH transmission mode.

3. The terminal apparatus according to claim 1, wherein the terminal capability information with predefined information indicates that the PDSCH transmission mode is supported.

4. A terminal apparatus which communicates with a base station apparatus, the terminal apparatus comprising:
   a transferring circuit configured and/or programmed to transfer, to the base station apparatus, information set to "1", wherein the information set to "1" indicates that a functionality of a PDSCH transmission mode with 8 CSI reference signal ports is supported by the terminal apparatus; and
   a reporting circuit configured and/or programmed to report a channel state information computed from a channel measurement, wherein
   the channel measurement in the PDSCH transmission mode with 8 CSI reference signal ports is based on only CSI-RS.

5. A terminal apparatus which communicates with a base station apparatus, the terminal apparatus comprising:
   a transferring circuit configured and/or programmed to transfer, to the base station apparatus, information set to "0", wherein the information set to "0" indicates that a functionality of a PDSCH transmission mode with 8 CSI reference signal ports is not supported by the terminal apparatus; and a reporting circuit configured and/or programmed to report a channel state information computed from a channel measurement, wherein the channel measurement in the PDSCH transmission mode with 8 CSI reference signal ports is based on only CSI-RS.

6. A base station apparatus which communicates with a terminal apparatus, the base station apparatus comprising:

a receiving circuit configured and/or programmed to receive terminal capability information from the terminal apparatus, the terminal capability information indicating whether the terminal apparatus supports a PDSCH transmission mode with 8 CSI reference signal ports; and the receiving circuit configured and/or programmed to receive a channel state information computed from a channel measurement, the channel measurement being derived by the terminal apparatus, wherein the channel measurement in the PDSCH transmission mode with 8 CSI reference signal ports is based on only CSI-RS.

7. The terminal apparatus according to claim 1, wherein the terminal capability information further indicates carrier aggregation information.

8. A communication method used for a terminal apparatus which communicates with a base station apparatus, the method comprising:

transferring terminal capability information to the base station apparatus, the terminal capability information indicating whether the terminal apparatus supports a PDSCH transmission mode with 8 CSI reference signal ports; and reporting a channel state information computed from a channel measurement, wherein the channel measurement in the PDSCH transmission mode with 8 CSI reference signal ports is based on only CSI-RS.

9. The communication method according to claim 8, wherein the terminal capability information further indicates carrier aggregation information.

10. The communication method according to claim 8, wherein an up to 8 layer PDSCH transmission scheme is applicable in the PDSCH transmission mode.

11. The communication method according to claim 8, wherein the terminal capability information with predefined information indicates that the PDSCH transmission mode is supported.

12. A communication method used for a terminal apparatus which communicates with a base station apparatus, the method comprising:

transferring, to the base station apparatus, information set to "1", wherein the information set to "1" indicates that a functionality of a PDSCH transmission mode with 8 CSI reference signal ports is supported by the terminal apparatus; and reporting a channel state information computed from a channel measurement, wherein the channel measurement in the PDSCH transmission mode with 8 CSI reference signal ports is based on only CSI-RSI.

13. A communication method used for a terminal apparatus which communicates with a base station apparatus, the method comprising:

transferring, to the base station apparatus, information set to "0", wherein the information set to "0" indicates that a functionality of a PDSCH transmission mode with 8 CSI reference signal ports is not supported by the terminal apparatus; and reporting a channel state information computed from a channel measurement, wherein the channel measurement in the PDSCH transmission mode with 8 CSI reference signal ports is based on only CSI-RS.

14. A communication method used for a base station apparatus which communicates with a terminal apparatus, the method comprising:

receiving terminal capability information from the terminal apparatus, the terminal capability information indicating whether the terminal apparatus supports a PDSCH transmission mode with 8 CSI reference signal ports; and receiving a channel state information computed from a channel measurement, the channel measurement being derived by the terminal apparatus, wherein the channel measurement in the PDSCH transmission mode with 8 CSI reference signal ports is based on only CSI-RS.

15. The terminal apparatus according to claim 1, further comprising:

a channel measurement circuit configured and/or programmed to derive the channel measurement for computing the channel state information.

16. The terminal apparatus according to claim 4, further comprising:

a channel measurement circuit configured and/or programmed to derive the channel measurement for computing the channel state information.

17. The terminal apparatus according to claim 5, further comprising:

a channel measurement circuit configured and/or programmed to derive the channel measurement for computing the channel state information.

18. The communication method according to claim 8, further comprising:

deriving the channel measurement for computing the channel state information.

19. The communication method according to claim 12, further comprising:

deriving the channel measurement for computing the channel state information.

20. The communication method according to claim 13, further comprising:

deriving the channel measurement for computing the channel state information.

* * * * *